United States Patent
Youssefi-Shams et al.

(10) Patent No.: US 9,004,334 B2
(45) Date of Patent: *Apr. 14, 2015

(54) HOLDER FOR A HANDHELD ELECTRONIC DEVICE

(71) Applicant: BlackBerry Limited, Waterloo (CA)

(72) Inventors: Kasra Youssefi-Shams, Waterloo (CA); Michael Xingyi Yu, Waterloo (CA); Felipe Oliveira Simoes, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,699

(22) Filed: Aug. 6, 2014

(65) Prior Publication Data

US 2014/0340844 A1 Nov. 20, 2014

Related U.S. Application Data

(63) Continuation of application No. 13/249,610, filed on Sep. 30, 2011, now Pat. No. 8,827,129.

(60) Provisional application No. 61/435,378, filed on Jan. 24, 2011.

(51) Int. Cl.
| | |
|---|---|
| A45F 5/00 | (2006.01) |
| G06F 1/16 | (2006.01) |
| A45C 11/00 | (2006.01) |

(52) U.S. Cl.
CPC ......... G06F 1/1628 (2013.01); *A45C 2011/002* (2013.01); *A45F 2200/0516* (2013.01); *Y10S 224/93* (2013.01)

(58) Field of Classification Search
CPC .................. A45C 2011/002; A45F 2200/0516
USPC .................................... 224/930, 676; 206/320
See application file for complete search history.

(56) References Cited

U.S. PATENT DOCUMENTS

| 6,367,672 B1 | 4/2002 | Lind |
| 2002/0175099 A1 | 11/2002 | Wu |

(Continued)

FOREIGN PATENT DOCUMENTS

| DE | 10 2007 010 657 A1 | 9/2008 |
| EP | 2073103 A1 | 6/2009 |
| FR | 2 915 055 A1 | 12/2007 |

OTHER PUBLICATIONS

AVAGO Technologies, ADBS-A320 Optical Finger Navigation Data Sheet, dated Jan. 15, 2010.

(Continued)

*Primary Examiner* — Justin Larson
(74) *Attorney, Agent, or Firm* — Ridout & Maybee LLP (57) ABSTRACT

A holder for a handheld electronic device, the holder including a container defining a space for receiving the handheld electronic device and an inner surface facing inwardly towards the space. At least a portion of the inner surface includes an infrared-neutral material or coating operative for interacting with infrared light emitted from the handheld electronic device and received by the infrared-neutral material. The interaction is such that, while the handheld electronic device is being received by the container, any reflected infrared signal effected by the interaction is inoperative for effecting activation of a functionality of the handheld electronic device when the reflected infrared signal is sensed by the handheld electronic device.

16 Claims, 8 Drawing Sheets

(56) References Cited

U.S. PATENT DOCUMENTS

| | | |
|---|---|---|
| 2004/0016658 A1 | 1/2004 | Le et al. |
| 2005/0092504 A1 | 5/2005 | Walthall et al. |
| 2005/0255898 A1 | 11/2005 | Huang |
| 2006/0196792 A1 | 9/2006 | Barth et al. |
| 2006/0226039 A1 | 10/2006 | Goradesky |
| 2007/0099650 A1 | 5/2007 | Brunstrom et al. |
| 2008/0032758 A1 | 2/2008 | Rostami |
| 2010/0076678 A1 | 3/2010 | Skarine |

OTHER PUBLICATIONS

Discount Cell, Cell Phone Holsters, Pouches, and Belt Clips, http://www.discountcell.com/cellular/cell-phone-holsters.htm, retrieved on Nov. 10, 2010.

Blackberry Limited, Inside the Trackpad: a BlackBerry Science Lesson, http://blogs.balckberry.com/2009/12/inside-the-trackpad-a-blackberry-science-lesson/, dated Dec. 18, 2009, retrieved on Nov. 11, 2010.

OSM Group, Solutions for Channel Sample of R003, dated Nov. 13, 2010.

HOLDER FOR A HANDHELD ELECTRONIC DEVICE

CROSS-REFERENCE TO RELATED APPLICATIONS

This application is a continuation of U.S. patent application Ser. No. 13/249,610, filed on Sep. 30, 2011 and issued as U.S. Pat. No. 8,827,129 on Sep. 9, 2014, and claims all benefits, including of priority under 35 U.S.C. 119(e), to U.S. Provisional Patent Application Ser. No. 61/435,378, filed Jan. 24, 2011.

TECHNICAL FIELD

This relates to the field of holders for handheld electronic devices.

BACKGROUND OF THE ART

Conventional holders (such as holsters or carrying cases) for handheld electronic devices (electronic devices sized to be held or carried in a human hand) may typically include a fabric inner surface, to avoid damage (e.g., scratches) to the device. However, such inner surfaces may interact with and/or activate any infrared-sensitive components of the device, such as an infrared-activated navigation device or function.

For example, a handheld electronic device may include a component that may be activated by an infrared signal, including a navigation function or a navigation device, such as an infrared-activated or infrared-sensitive touch pad. When such a device is placed in a conventional holder, relative movement between the holder inner surface and the device may be detected as intentional input by the component, resulting in undesirable activation of the component. Typically, the device may be rendered passive or placed into sleep mode when placed inside a holder. However, there may be a short period of time before the device is placed into sleep mode, and unintentional or undesirable activation may occur in this period of time.

DETAILED DESCRIPTION OF PREFERRED EMBODIMENTS

Handheld Electronic Device

Figure 8:
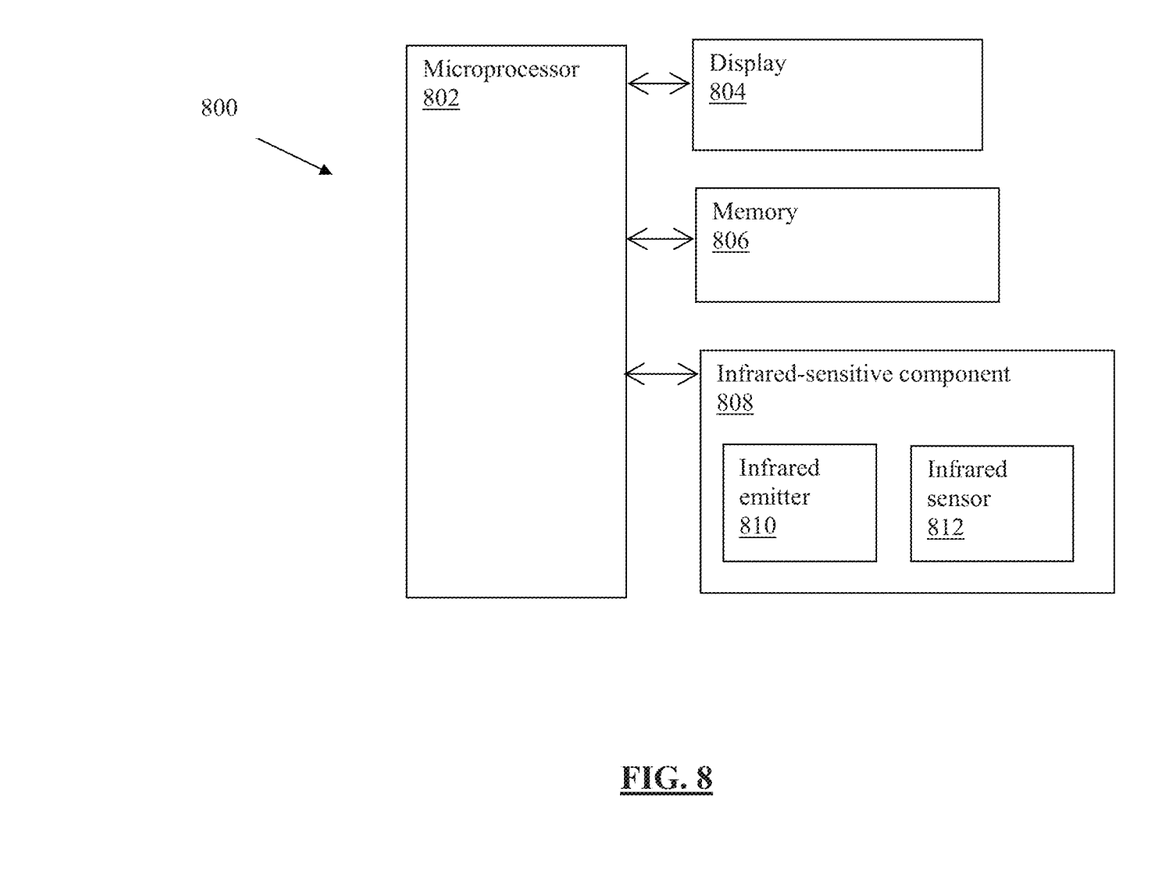
FIG. 8 is a perspective view of an example handheld electronic device suitable for the disclosed holder.

FIG. 8 shows an example handheld electronic device 800 suitable for use with an example holder of the present disclosure.

In this example, the handheld electronic device 800 includes a microprocessor 802 for reading and executing computer-executable instructions, in order to carry out tasks and functions of the handheld electronic device 800. The microprocessor 802 is coupled to a display 804 for displaying output (e.g., via a graphical user interface) to a user. The microprocessor 802 is also coupled to a memory 806 (e.g., a read-only memory (ROM), a random-access memory (RAM), a flash memory or any other suitable memory) for storing and accessing data signals and computer-executable instructions. The microprocessor 802 is also coupled to an infrared-sensitive component 808, for example an infrared-sensitive navigation component, such as an optical trackpad or trackball. The infrared-sensitive component 808, when activated, effects one or more functions of the handheld electronic device 800 (in some examples, activation of an infrared-sensitive navigation component effects navigation of a user interface). Although the handheld electronic device 800 is shown as including one microprocessor 802, one display 804, one memory 806 and one infrared-sensitive component 808, in some examples the handheld electronic device 800 includes more than one of any of these components. Although the handheld electronic device 800 is described as including the infrared-sensitive component 808, in some examples the infrared-sensitive component 808 is part of another component.

The infrared-sensitive component 808, in this example, includes an infrared emitter 810 and an infrared sensor 812. The infrared emitter 810 emits infrared light and the infrared sensor 812 senses infrared light. The infrared-sensitive component 808 is activated when the infrared sensor 812 senses a suitable or operative infrared signal. An infrared signal that is sufficient to effect activation of the infrared-sensitive component 808, in some examples, is a modulated or attenuated reflection of the infrared light emitted by the infrared emitter 810. The activation is caused by an infrared signal that has an intensity that is within a range of operative fractions of the intensity of the emitted infrared light. In some examples, the reflected infrared light that is sensed by the infrared sensor 812 has an intensity within 50% to 70% of the intensity of the emitted infrared light, in order to cause activation of the infrared-sensitive component 808.

In some examples, when the infrared sensor 812 senses no or low level infrared signals (e.g., 10% or lower of the infrared light level emitted by the infrared emitter 810), there is no activation of the infrared-sensitive component 808. Alternatively or in addition, when the infrared sensor 812 senses infrared signals near or substantially equal to the infrared light emitted by the infrared emitter 810 (e.g., at least 70%, of the infrared light emitted by the infrared emitter 810), there is no activation of the infrared-sensitive component or functionality 808.

In some embodiments, the handheld electronic device 800 is a wireless communication device, a portable communication device, or any other suitable handheld electronic device. Other examples of suitable handheld electronic devices include, for example, cellular phones, mobile handhelds, digital wireless phones, 1-way pagers, 1½-way pagers, 2-way pagers, electronic mail appliances, internet appliances, personal digital assistants (PDA), laptop computers, tablet computers, global positioning system (GPS) or other mapping devices, handheld games, remote controls, portable digital audio players, and the like.

Figure 9:
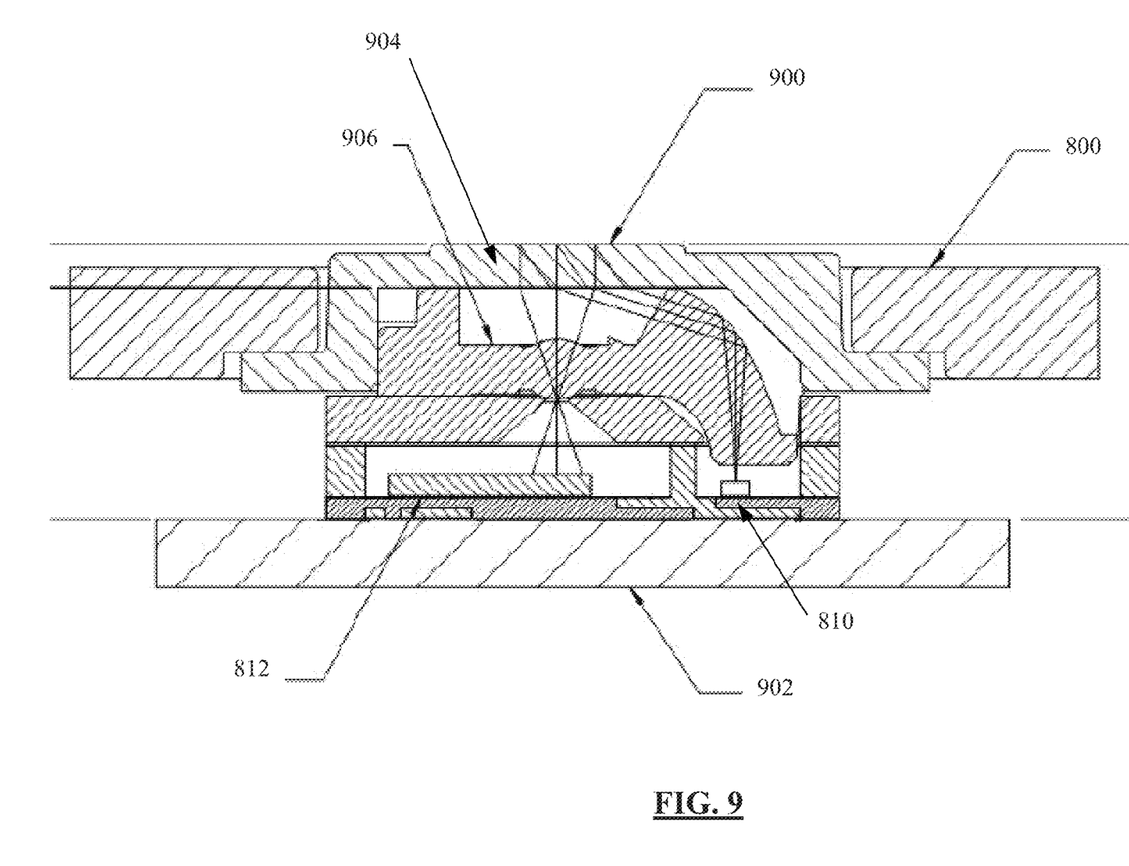
FIG. 9 is a cross-sectional view of an example infrared-sensitive component suitable for the device of FIG. 8.

Reference is now made to FIG. 9. In some embodiments, the infrared-sensitive component includes an optical navigation device 900 that includes the infrared emitter 810 and the infrared sensor 812. FIG. 9 shows a cross-sectional view of an example optical navigation device 900 that is included in the example infrared-sensitive component 808 of the example handheld electronic device 800.

The example optical navigation device 900 is coupled to the casing 902 of the handheld electronic device 800. In this example, the optical navigation device 900 includes a navigation surface 904, a lens 906, an infrared emitter 810, and an infrared sensor 812.

The navigation surface 904 receives touch or contact input, for example from a user's finger or other pointing means (e.g., a stylus) to direct navigation of, for example, a user interface shown on the display 804.

In this example, the infrared emitter 810 emits infrared light towards the navigation surface 904 and the infrared sensor 812 receives an infrared signal from the navigation surface 904. The lens 906 helps to focus any received infrared signal towards the infrared sensor 812. The infrared sensor 812 samples the received infrared signal at a relatively high rate, for example several samples per second (e.g., up to 15 samples per second).

Although not shown, in some examples the optical navigation device 900 also includes other components as appropriate to process and transmit navigation signals, such as an image acquisition system, a digital signal processor and/or a communication system.

In this example, the optical navigation device 900 is based on optical finger navigation technology. Navigation directions are sensed as changes in infrared signals at the navigation surface 904, using sequential infrared images of the navigation surface 904 to determine the direction and/or magnitude of navigation. For example, the image acquisition system acquires surface images from the navigation surface 904 (which, in some examples, has a resolution in the range of several millimeters to several micrometers) via the lens 906. The acquired images are processed by the digital signal processor to determine direction and distance of any motion, for example by calculating the magnitude and/or rate of changes in x and y location of one or more landmarks, gradations or reference marks in the image. Any detected motion is transmitted (e.g., by the communication system) as a navigation signal, for example to the microprocessor 802, for further processing (e.g., as cursor navigation, scrolling or other navigation commands).

Holder for Handheld Electronic Device

Figure 1:
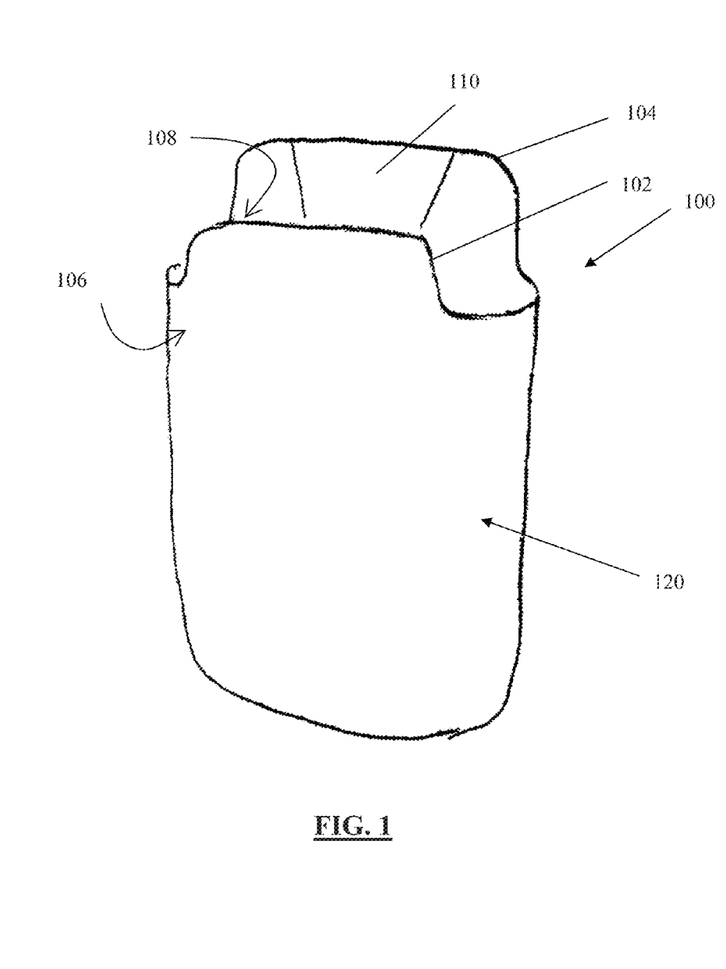
FIG. 1 is a perspective view of an example holder.
Figure 2:
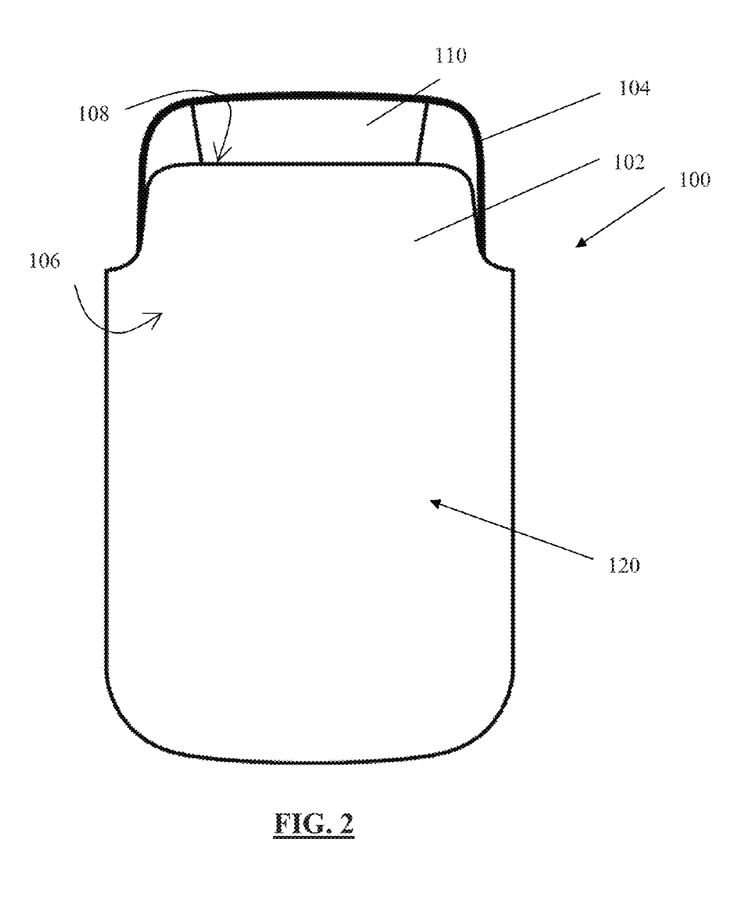
FIG. 2 is a front view of an example holder.
Figure 3:
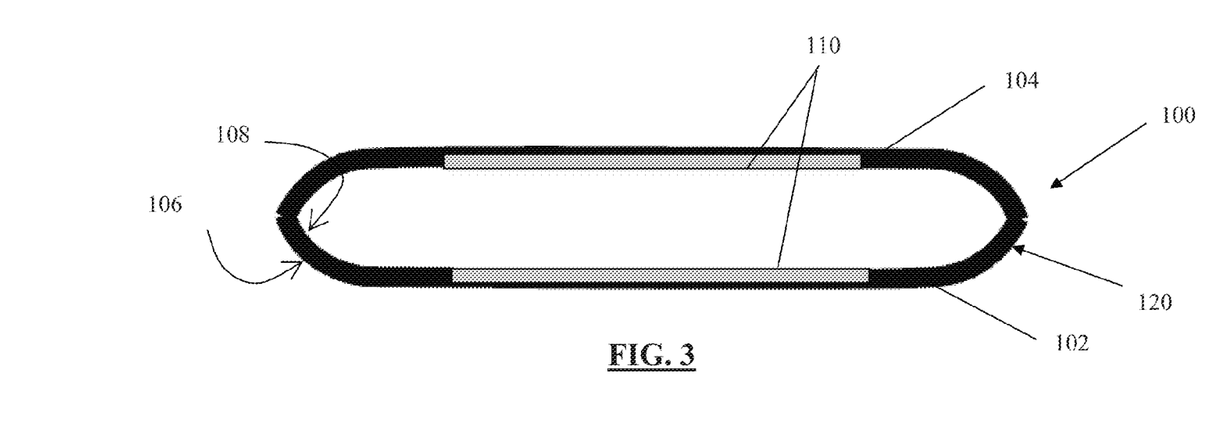
FIG. 3 is a top-down view of an example holder.
Figure 4:
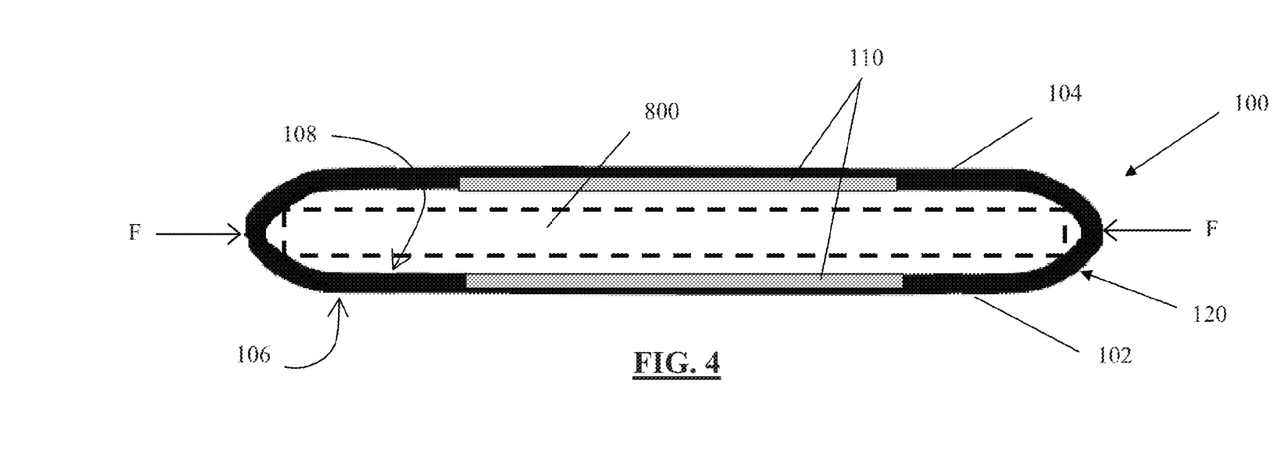
FIG. 4 is a top-down view of an example holder after receiving an example handheld electronic device.

FIGS. 1 and 2 show perspective and front views of an example holder 100 for a handheld electronic device, such as the device 800 of FIG. 8. FIGS. 3 and 4 show top-down views of the example holder 100 in an undeformed state (FIG. 3) and a deformed state (FIG. 4).

The holder 100 includes a container 120 defining a space for receiving the handheld electronic device 800. In some examples, the container 120 is adjustable (e.g., deformable, self-fitting, capable of being calibrated by a user or flexible so as to accommodate the handheld electronic device 800) to effect an increase or a decrease to the space. The container 120 includes an inner surface 108 facing inwardly towards the space. In some examples, when the handheld electronic device 800 is received in the container 120, deformation of the container 120 (e.g., at one or more deformable container portions, such as deformable side portions) is effected to provide at least one deformed container portion. The adjustability of the container 120, to effect the increase or the decrease to the space, is attributable to the deformable portion(s). The deformed portion(s) of the container 120 then exerts a force "F" that urges at least a portion of the deformed container 120 (e.g., side portions) against at least a portion of the received handheld electronic device 800, to effect the increase or the decrease to the space.

In some examples, the holder 100 includes a front half 102 connected to a back half 104. In other examples (not shown), the holder 100 is formed as one integral piece, or is formed from more than two halves (e.g., including bottom and/or side portions). Regardless, components of the holder 100, individually or in cooperation with each other, form the container 120.

In this example, the front half 102 and the back half 104 cooperate to form the container 120. In some examples, the front half 102 and back half 104 are directly attached (e.g., with adhesive, stitching or other fastening methods). In other examples, the front half 102 and back half 104 are indirectly attached to each other (e.g., via one or more intervening panels or components). In addition to the inner surface 108, in some examples the container 120 also includes an outer surface 106 that faces outwardly from the space of the container 120.

Although the container 120 is shown in FIG. 1 as having no spaces or gaps, in some examples the container 120 includes one or more gaps, for example along side portions and/or at corner portions, which, in some examples, allows the container 120 to accommodate different sizes and types of handheld electronic devices 800.

As shown in FIGS. 3 and 4, in some examples, when the example handheld electronic device 800 is received in the container 120, the deformable portion(s) of the container 120 (in this example, the side portions) is stretched width-wise to accommodate the handheld electronic device 800. The deformed portion(s) of the container 120 then exert(s) a force "F" on the sides of the received handheld electronic device 800.

In some examples, the deformable portion(s) of the container 120 includes a resilient material, which allow the above-described deformation and exerts the force "F" urging the deformed portion(s) of the container 120 against at least a portion of the received handheld electronic device 800. Where the holder 100 is formed from laminating layers of material together, in some examples, one or more portions of the holder 100, such as the sides of the container 120, include fewer layers, such that they are more easily deformable while still retaining at least some resiliency. In other examples, one or more portions of the holder 100 are provided with a biasing material (e.g., a shape-memory material), so as to provide the force "F".

Although FIG. 4 shows the container 120 being deformed width-wise, in other examples, the container 120 is additionally or alternatively deformed depth-wise, such as where the handheld electronic device 800 has a thickness greater than the depth of the holder 100. Other types of deformation of the container 120 are also possible. Although FIG. 4 shows the force "F" being exerted at opposing portions of the container 120, in other examples the force "F" is exerted at only one portion of the container 120, or is exerted at more than two portions of the container 120.

In this example, the force "F" urging at least a portion of the container 120 against at least a portion of the handheld electronic device 800 provides a friction fit or interference fit between the handheld electronic device 800 and the container 120. This interference fit typically is sufficient to retain the received handheld electronic device 800 within the container 120, such as against any unintentional loosening, while still allowing the handheld electronic device 800 to be manually removed from the container 120.

In some examples, at least the portion of the deformed container 120 that is urged against the handheld electronic device 800 includes and/or is lined with a material that prevents scratching, marring and/or other cosmetic damage to the handheld electronic device 800, while still ensuring contact with the handheld electronic device 800 sufficient to effect an interference fit. In some examples, the handheld electronic device 800 includes a substantially plastic outer shell or finish.

The inner surface 108 of the container 120, in some examples, includes and/or is lined with a substantially soft or yielding material, such as a soft plastic, a soft textile or a soft leather that does not scratch, mar or otherwise damage the handheld electronic device 800, and includes a coefficient of friction with the handheld electronic device 800 sufficient to effect an interference fit with the handheld electronic device 800 received in the container 120 while still permitting manual insertion and removal of the handheld electronic device 800 from the container 120 (in some examples, acceptability of a material for permitting manual insertion of the handheld electronic device 800 is determined by subjecting the material to insertion tests). The material lining the inner surface 108 of the container 120, in some examples, is any suitably soft or yielding material that acceptably cushions a handheld electronic device 800 held in the container 120 against any expected drops or other forces (in some examples, acceptability of a material is determined by subjecting the material to drop tests).

In some examples, the container 120 is formed of a relatively hard plastic material, and the inner surface 108 of the container 120 includes a soft-touch finish (e.g., a layer of coating is sprayed onto the inner surface 108, to provide a relatively soft and/or smooth surface). This may be suitable for reducing wear on the handheld electronic device 800 and/or the inner surface 108 of the container 120 without requiring a liner. The use of a soft-touch finish may be suitable where the inner surface 108 is substantially planar, without protruding features or textures.

In some examples, the container 120 does not exhibit the deformation and does not effect the force "F" as described above for retaining the handheld electronic device 800. In some examples, the holder 100 includes a strap for retaining the handheld electronic device 800 instead of relying on an interference fit.

Additional Variations of the Holder

In some embodiments, the holder 100 is provided with a fastener (not shown) on its outer surface 106, for fastening the holder 100 to a user or to an article of clothing. Examples of a suitable fastener include a clip, a belt-loop, a buckle, a hook-and-loop fastener, or any other suitable fastener. Where the fastener is a clip, the fastener is operable manually to move from a default closed position to an opened position.

In some embodiments, the holder 100 is provided with an adjustable strap (not shown) for effecting an increase or a decrease to the space of the container 120. In the first aspect of the holder (described below), where the container 120 is adjustable, the adjustability of the container 120 is effected by the strap. In some examples, the strap is attached to the outer surface 106 of the back half 104 and extends over the space of the container 120, and is configured for releasable coupling to the outer surface 106 of the front half 102. The strap helps to decrease the space of the container 120 and thus retain the handheld electronic device 800 within the container 120 instead of or in addition to the interference fit described above. In some examples, the releasable coupling is effected by interaction of a hook-and-loop fastener, a magnetic interaction between magnets provided in the strap and in the front half 102, or by releasable fasteners such as a buckle, a button or a clasp.

In some embodiments, the holder 100 further includes one or more magnets (not shown) on the container 120. The one or more magnets serve to trigger a passive mode or sleep mode of the handheld electronic device 800 when the handheld electronic device 800 is received in the container 120. In some examples, the one or more magnets are positioned to align with a magnetic sensor on the handheld electronic device 800. In some examples, the one or more magnets are attached to the outer surface 106, the inner surface 108, or in an inner layer between the outer surface 106 and the inner surface 108 of the container 120.

First Aspect of the Holder

As shown in FIGS. 1-5, in the first aspect, at least a portion of the inner surface 108 includes an infrared-neutral material 110. The infrared-neutral material 110 is operative for preventing activation of an infrared-sensitive component of the handheld electronic device 800. The infrared-neutral material 110 interacts with any infrared light emitted by the handheld electronic device 800 (e.g., emitted by the infrared emitter 810) that is received by the infrared-neutral material 110. The interaction with the emitted infrared light, while the handheld electronic device 800 is being received by the container 120, results in a reflected infrared signal that is inoperative to effect activation of the infrared-sensitive component 808 when the reflected infrared signal is sensed by the handheld electronic device (e.g., sensed by the infrared sensor 812).

Figure 5:
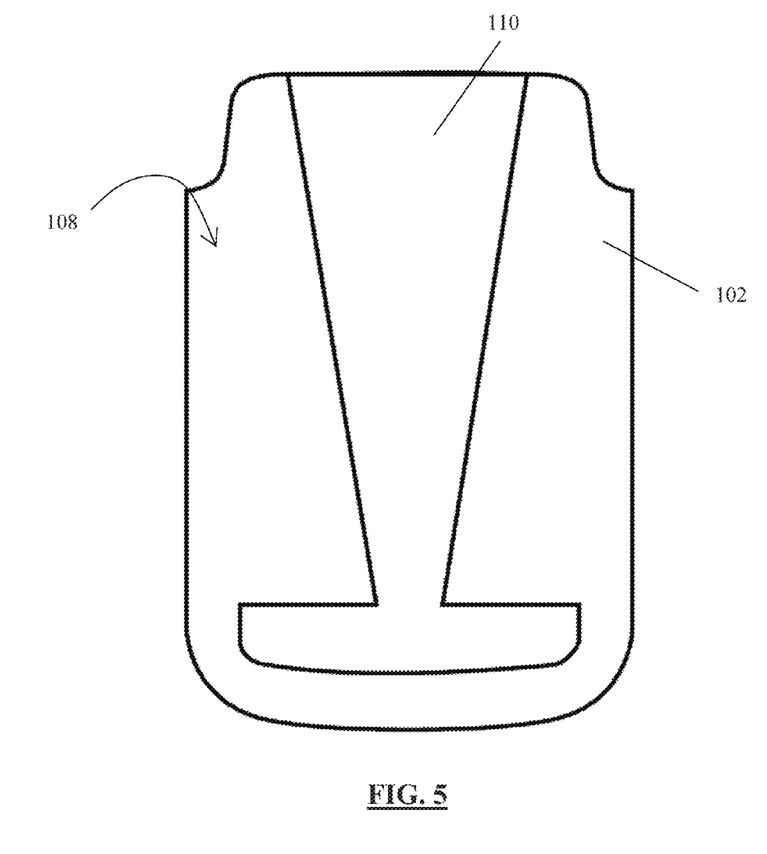
FIG. 5 is a front view of an inner surface of an example holder.

Such interaction includes reflection or absorption of at least a fraction of the emitted infrared light. The infrared-neutral material 110 absorbs or reflects at least a fraction (e.g., at least 50%) of emitted infrared light received from the handheld electronic device 800. Where such interaction includes absorption of at least a fraction of the emitted infrared light, in some examples 90% or more of the emitted infrared light from the infrared emitter 810 is absorbed, such that the infrared sensor 812 senses only 10% or less of the intensity of emitted infrared light. Where such interaction includes reflection of at least a fraction of the emitted infrared light, in some examples up to 70% or more of the emitted infrared light from the infrared emitter 810 is reflected, such that the infrared sensor 812 senses 70% or more of the intensity of emitted infrared light. Such interaction causes the reflected infrared signal to be other than an operative infrared signal that causes activation of the infrared-sensitive component 808. The interaction causes the reflected infrared signal to have an intensity that is outside the range of operative fractions (e.g., about 50% to about 70%) of the intensity of the emitted infrared light.

Although FIG. 5 shows the infrared-neutral material 110 being provided on the front half 102 of the holder 100, in other examples the infrared-neutral material 110 is provided on the back half 104 of the holder 100 or on both the front half 102 and the back half 104 of the holder 100 (for example, so that activation of the infrared-sensitive component is prevented regardless of which way the handheld electronic device 800 is facing when it is received in the container 120). In some examples, the infrared-neutral material 110 is provided in other portions of the inner surface 108 of the container 120, for example where the holder 100 does not include front and back halves 102, 104. In some examples, the infrared-neutral material 110 is positioned so as to be aligned with the infrared-sensitive component when the handheld electronic device 800 is being inserted into the container 120.

In some examples, a suitable infrared-reflecting material 110 includes any material that is substantially reflective to broad spectrum white light. In some examples, the infrared-neutral material 110 is a substantially smooth plastic material, such as polyurethane, polyether, polypropylene, polyethylene, polycarbonate (e.g., high gloss polycarbonate), polyethylene terephthalate, acrylonitrile butadiene styrene, or a mixture of polycarbonate and acrylonitrile butadiene styrene. Other examples of suitable materials include any material that is specifically reflective to infrared light, such as any plastic material with a high gloss surface finish.

In the present disclosure, infrared light includes light having wavelengths within the range of, for example, about 700 nm to about 300,000 nm or greater, for example about 700 nm to about 2,500 nm, or other wavelength ranges generally recognized as being infrared light.

In some examples, the infrared-neutral material 110 is not required to be infrared-neutral for all light within the full infrared wavelength range, but is infrared-neutral only for light having wavelengths that cause activation of the infrared-sensitive component 808 of the handheld electronic device 800.

In the present disclosure, the infrared-neutral material 110 is not required to be 100% neutral or invisible to incident infrared light, but is sufficiently infrared-neutral to prevent activation of the infrared-sensitive component or functionality 808. In some examples, instead of absorbing or reflecting 100% of the emitted infrared light, the infrared-neutral material absorbs or reflects only a fraction of the emitted infrared light, sufficient to prevent activation of the infrared-sensitive component 808, as described above.

In the first aspect, when the handheld electronic device 800 is received in the container 120, deformation of the container 120 (e.g., at one or more deformable container portions, such as deformable side portions) is effected to provide at least one deformed container portion. The deformed portion(s) of the container 120 then exerts a force "F" that urges at least a portion of the deformed container 120 (e.g., side portions) against at least a portion of the received handheld electronic device 800.

The deformable portion(s) of the container 120 includes a resilient material, which allow the above-described deformation and exerts the force "F" urging the deformed portion(s) of the container 120 against at least a portion of the received handheld electronic device 800. Where the holder 100 is formed from laminating layers of material together, in some examples, one or more portions of the holder 100, such as the sides of the container 120, include fewer layers, such that they are more easily deformable while still retaining at least some resiliency. In other examples, one or more portions of the holder 100 are provided with a biasing material (e.g., a shape-memory material), so as to provide the force "F".

In the first aspect, the force "F" urging at least a portion of the container 120 against at least a portion of the handheld electronic device 800 provides a friction fit or interference fit between the handheld electronic device 800 and the container 120. This interference fit typically is sufficient to retain the received handheld electronic device 800 within the container 120, such as against any unintentional loosening, while still allowing the handheld electronic device 800 to be manually removed from the container 120.

In some examples, at least the portion of the deformed container 120 that is urged against the handheld electronic device 800 includes and/or is lined with a material that prevents scratching, marring and/or other cosmetic damage to the handheld electronic device 800, while still ensuring contact with the handheld electronic device 800 sufficient to effect an interference fit. In some examples, the handheld electronic device 800 includes a substantially plastic outer shell or finish. The container 120, in some examples, includes and/or is lined with a substantially soft or yielding material, such as a soft plastic, a soft textile or a soft leather that does not scratch, mar or otherwise damage the handheld electronic device 800, but that has a coefficient of friction with the handheld electronic device 800 sufficient to effect an interference fit with the handheld electronic device 800 received in the container 120.

Figure 6:
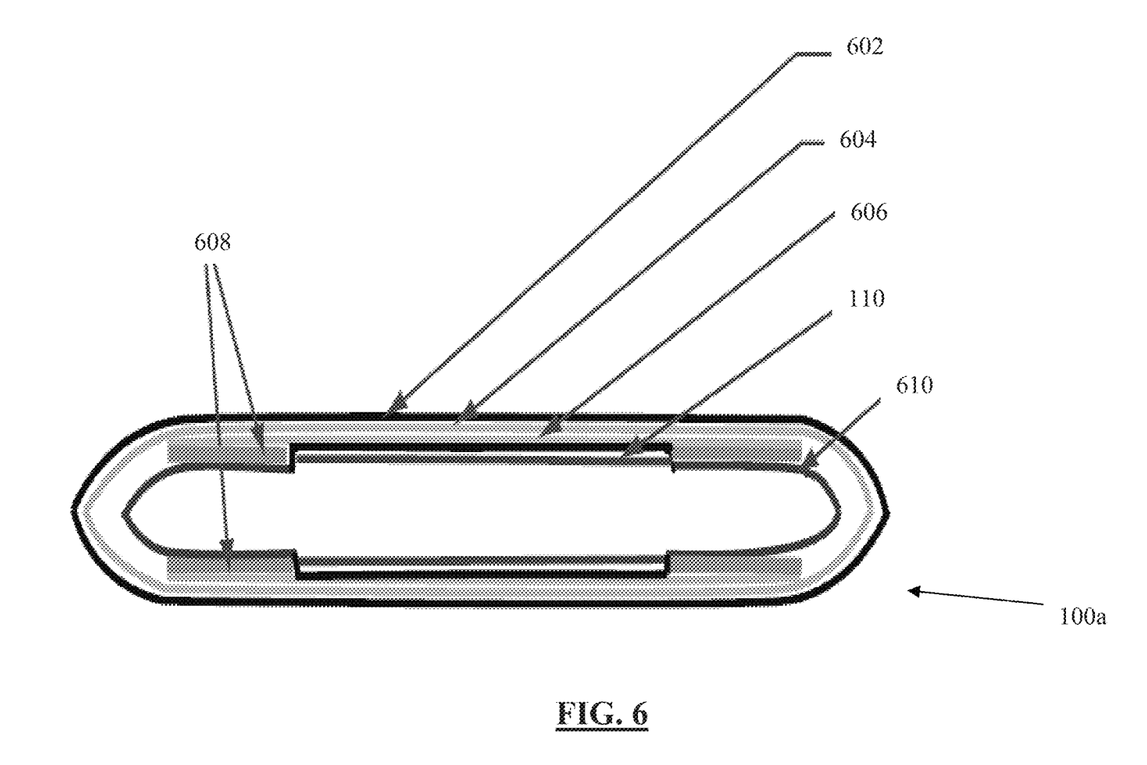
FIG. 6 is a cross-sectional view of a portion of an example holder including an infrared-neutral material.

FIG. 6 shows a cross-section of the container 120 of an example holder 100a having the infrared-neutral material 110, in accordance with the first aspect. FIG. 6 shows an example construction of the holder 100a, including a plurality of layers laminated together. In this example, the front half 102 and the back half 104 are substantially similar in construction, although in other examples the construction is different between the front half 102 and the back half 104.

In the example shown, the layers of the container 120, described from the outermost surface inwardly towards the space, include an outermost layer 602, an outer stiffening layer 604, an inner stiffening layer 606, a reinforcement layer 608, and a liner 610, in addition to the infrared-neutral material 110. In some examples, one or more of these layers are omitted and/or one or more layers are added.

In the example of FIG. 6, the outermost layer 602 is a flexible layer, such as a plastic (e.g., polyurethane, polyether, polypropylene, polyethylene, polyethylene terephthalate, polycarbonate (e.g., high gloss polycarbonate), acrylonitrile butadiene styrene, a mixture of polycarbonate and acrylonitrile butadiene styrene or other suitable plastic), a textile or leather, for example. In this example, the outermost layer 602 provides the outer surface 106 of the container 120, and is selected to have a pleasing aesthetic effect. In some examples, the outermost layer 602 has a thickness of about 0.5 mm to about 1.0 mm. In some examples, the outermost layer 602 is a polyurethane material that is about 0.8 mm thick.

In the example of FIG. 6, the outer stiffening layer 604 is provided to help increase the stiffness or rigidity of the container 120. In examples where the outermost layer 602 is made of a suitably stiff material (e.g., a suitably thick polypropylene material), the outer stiffening layer 604 is not required. In some examples, the outer stiffening layer 604 is provided over substantially all portions of the container 120. Although the outer stiffening layer 604 helps to increase the rigidity of the container 120, the outer stiffening layer 604 is still be sufficiently flexible and resilient so as to permit the deformation of the container 120 when the handheld electronic device 800 is received therein, and to effect the force "F" urging the container 120 against the handheld electronic device 800 when the container 120 is deformed. The outer stiffening layer 604 is made of any suitable material including, for example, a plastic (e.g., polypropylene or polyether), a textile (e.g., a soft vulcanized fiber), a metal (e.g., a thin shape-memory alloy), or any other suitable material. In some examples, the outer stiffening layer 604 has a thickness of about 0.5 mm to about 1.0 mm. In some examples, the outer stiffening layer 604 is a soft vulcanized fiber material that is about 0.6 mm thick.

In the example of FIG. 6, the inner stiffening material 606 is provided to further increase the rigidity of the container 120, and is provided only in select portions of the container 120. In some examples, the absence of the inner stiffening material 606 in one or more portions of the container 120 provides one or more corresponding deformable portions of the container 120. In examples where the container 120 is designed to include deformable side portions (e.g., allowing the container 120 to deform width-wise), the inner stiffening material 606 is absent in the side portions of the container 120. The inner stiffening material 606 is made of any suitable material including, for example, a plastic (e.g., polypropylene or polyether), a textile (e.g., a vulcanized fiber), a metal (e.g., a thin shape-memory alloy), or any other suitable material. In some examples, the inner stiffening material 606 has a thickness of about 0.5 mm to about 1.5 mm. In some examples, the inner stiffening material 606 is a vulcanized fiber material that is about 1.0 mm thick.

In the example of FIG. 6, the reinforcement material 608 is provided to further increase the rigidity of the container 120, and is absent from one or more deformable portions of the container 120. For example, where the container 120 is designed to include deformable side portions (e.g., allowing the container 120 to deform width-wise), the reinforcement material 608 is absent in the side portions of the container 120. In some examples, the reinforcement material 608 serves to reinforce a joint in the container 120 where the infrared-neutral material 110 is provided. In some examples, the reinforcement material 608 includes a notch or recess to help create a substantially continuous level surface on either side of the infrared-neutral material 110. The reinforcement material 608 is made of any suitable material including, for example, a plastic (e.g., polypropylene or polyether), a textile (e.g., a vulcanized fiber), a metal (e.g., a thin shape-memory alloy), or any other suitable material. In some examples, the reinforcement material 608 has a thickness of about 0.5 mm to about 2.0 mm. In some examples, the reinforcement material 608 is a vulcanized fiber material that is about 1.2 mm thick.

In the example of FIG. 6, the liner 610 provides the inner surface 108 of the container 120, with the exception of any portions having the infrared-neutral material 110. For example, as shown in FIG. 6, the infrared-neutral material is provided over the liner 610 on the inner surface 108 in one or more portions of the container 120. In some examples, the liner 610 is selected to have a pleasing aesthetic effect. In some examples, the liner 610 is a flexible layer, such as a plastic (e.g., polyurethane, polyether, polypropylene, polyethylene, polyethylene terephthalate, polycarbonate (e.g., high gloss polycarbonate), acrylonitrile butadiene styrene, a mixture of polycarbonate and acrylonitrile butadiene styrene or other suitable plastic), a textile (e.g., a felt material or a fiber material) or leather, for example. In this example, the liner 610 is made of a material selected to avoid scratching or marring of the handheld electronic device 800. In this example, the liner 610 is made of a material that is substantially softer and/or more yielding than the outer shell or outer finish of the handheld electronic device 800. The liner 610 is also made of a material designed to have a coefficient of friction with the handheld electronic device 800 sufficient to effect an interference fit when the handheld electronic device 800 is received in the container 120. In some examples, the liner 610 has a thickness of about 0.1 mm to about 1.0 mm. In some examples, the liner is a peach fiber material that is about 0.3 mm thick.

In the example of FIG. 6, the infrared-neutral material 110 includes a substantially smooth material (e.g., a plastic material, such as a plastic material having a high gloss surface finish) that serves to reflect a sufficient amount of incident infrared light emitted from the handheld electronic device 800 (e.g., at least 50% or at least 70% of infrared light emitted from the infrared emitter 810), to prevent activation of the infrared-sensitive component 808 of the handheld electronic device 800. In some examples, the infrared-neutral material 110 includes a substantially smooth, reflective plastic material, such as high-gloss polyurethane. In this example, the infrared-neutral material 110 has a thickness of about 0.1 mm to about 1.5 mm, for example about 0.6 mm. In some examples, the infrared-neutral material 110 is integrally formed or bonded (e.g., thermally bonded) to one or more layers, such as the liner 610. In other examples, the infrared-neutral material 110 includes infrared-absorbing components and the infrared-neutral material 110 serves to absorb a sufficient amount of incident infrared light (e.g., at least 50% or at least 90% of infrared light emitted from the infrared emitter 810), to prevent activation of the infrared-sensitive component 808 of the handheld electronic device 800.

Although the outermost layer 602, outer stiffening layer 604, inner stiffening layer 606, reinforcement layer 608, liner 610, and infrared-neutral material 110 have been described has having certain thicknesses, other thickness values are possible. The thickness of each of the outermost layer 602, outer stiffening layer 604, inner stiffening layer 606, reinforcement layer 608, liner 610, and infrared-neutral material 110 may vary depending on the material used as well as the method for processing the material.

Second Aspect of the Holder

In a second aspect, at least a portion of the inner surface 108 includes an infrared-neutral coating. The infrared-neutral coating interacts with emitted infrared light received by the infrared-neutral coating from the handheld electronic device 800 (e.g., emitted by the infrared emitter 810) such that, while the handheld electronic device 800 is being received by the container 120, the resulting reflected infrared signal is inoperative to effect activation of the infrared-sensitive component 808 of the handheld electronic device 800. The interaction with the emitted infrared light results in a reflected infrared signal that is inoperative to effect activation of the infrared-sensitive component or functionality 808 when the reflected infrared signal is sensed by the handheld electronic device (e.g., sensed by the infrared sensor 812).

Such interaction includes reflection or absorption of at least a fraction of the emitted infrared light. The infrared-neutral coating absorbs or reflects at least a fraction (e.g., at least 50%) of emitted infrared light received from the handheld electronic device 800. Where such interaction includes absorption of at least a fraction of the emitted infrared light, in some examples 90% or more of the emitted infrared light from the infrared emitter 810 is absorbed, such that the infrared sensor 812 senses only 10% or less of the intensity of emitted infrared light. Where such interaction includes reflection of at least a fraction of the emitted infrared light, in some examples up to 70% or more of the emitted infrared light from the infrared emitter 810 is reflected, such that the infrared sensor 812 senses 70% or more of the intensity of emitted infrared light. Such interaction causes the reflected infrared signal to be other than an operative infrared signal that causes activation of the infrared-sensitive component 808. The interaction causes the reflected infrared signal to have an intensity that is outside the range of operative fractions (e.g., about 50% to about 70%) of the intensity of the emitted infrared light.

The infrared-neutral coating, in some examples, is included on the entire inner surface 108. In other examples, the infrared-neutral coating is included only on a portion of the inner surface 108, such as only on portion(s) of the inner surface 108 aligned with the infrared-sensitive component when the handheld electronic device 800 is being inserted into the container 120. In some examples, the infrared-neutral coating is included on at least a portion of the inner surface 108 corresponding only to the front half 102 of the holder 100, or corresponding onto to the back half 104 of the holder 100. In some examples, the infrared-neutral coating is included on at least portions of the inner surface 108 corresponding to both the front half 102 and the back half 104 of the holder 100 (for example, so that activation of the infrared-sensitive component is prevented regardless of which way the handheld electronic device 800 is facing when it is received in the container 120).

In some examples, the infrared-neutral coating is any suitable paint or coating that prevents activation of the infrared-sensitive component of the handheld electronic device. In some examples, the infrared-neutral coating is infrared-absorbing or infrared-reflecting.

Examples of a suitable infrared-neutral coating include infrared-absorbent constituents such as: thin film metals (including, for example, copper, gold, nickel, silver, and combinations thereof), metal oxides (including, for example, hafnium oxide, indium tin oxide, magnesium oxide, silicon monoxide, titanium dioxide, tantalum oxide, zirconium oxide, and combinations thereof), nickel manganese ferrite, iron chromite, cadmium stannate, organic compounds (including, for example, chlorophyll), and combinations thereof. In some examples, the infrared-neutral coating is any suitable infrared-invisible paint, such as those used for camouflage or stealth purposes.

In some examples, the infrared-neutral coating is an infrared-reflective paint or coating, including paints and/or pigments developed for heat-reflection purposes, such as the Arctic® pigments developed by Shepherd Color Company, the Insultec™ head reflective paints, the ZEFFLE™ infrared reflective coatings, and other suitable paints or coatings.

In some examples, the infrared-neutral coating is an infrared-absorbing paint or coating, including paints and/or pigments such as the Vanceva™ coating developed by Solutia and Sumitomo Metal Mining.

In the present disclosure, infrared light includes light having wavelengths within the range of, for example, about 700 nm to about 300,000 nm or greater, for example about 700 nm to about 2,500 nm, or other wavelength ranges generally recognized as being infrared light.

In some examples, the infrared-neutral coating is not required to be infrared-neutral for all light within the full infrared wavelength range, but is infrared-neutral only for light having wavelengths that causes activation of the infrared-sensitive component 808 of the handheld electronic device 800.

In the present disclosure, the infrared-neutral coating is not required to be 100% neutral or invisible to incident infrared light, but is sufficiently infrared-neutral to prevent activation of the infrared-sensitive component or functionality 808. In some examples, instead of absorbing or reflecting 100% of the emitted infrared light, the infrared-neutral material absorbs or reflects only a fraction of the emitted infrared light, sufficient to prevent activation of the infrared-sensitive component 808, as described above.

Figure 7:
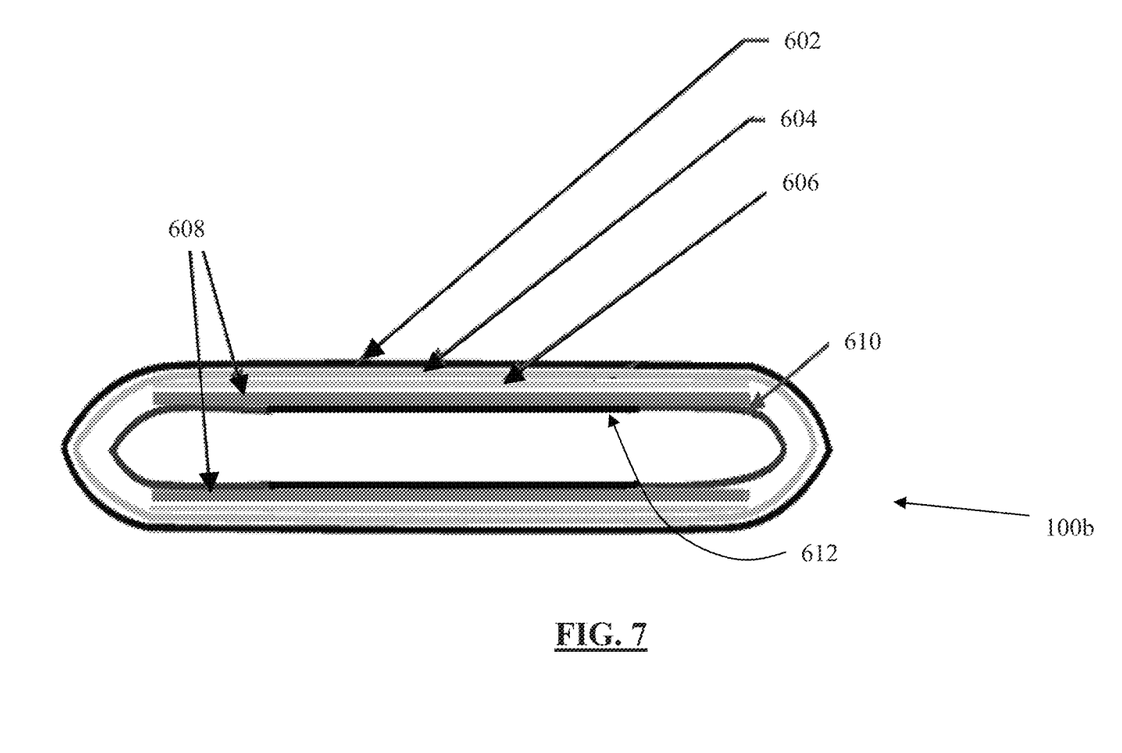
FIG. 7 is a cross-sectional view of a portion of another example holder including an infrared-neutral coating.

FIG. 7 shows a cross-section of the container 120 of an example holder 100b having an infrared-neutral coating 612, in accordance with the second aspect. As shown in FIG. 7, the example holder 110b includes a container 120 having an outermost layer 602, an outer stiffening layer 604, an inner stiffening layer 606, a reinforcement layer 608 and a liner 610. In other examples, one or more of these layers are omitted and/or one or more layers are added.

In the example of FIG. 7, the outermost layer 602 is a flexible layer, such as a plastic (e.g., polyurethane, polyether, polypropylene, polyethylene, polyethylene terephthalate, polycarbonate (e.g., high gloss polycarbonate), acrylonitrile butadiene styrene, a mixture of polycarbonate and acrylonitrile butadiene styrene or other suitable plastic), a textile or leather, for example. In this example, the outermost layer 602 provides the outer surface 106 of the container 120, and is selected to have a pleasing aesthetic effect. In some examples, the outermost layer 602 has a thickness of about 0.5 mm to about 1.0 mm. In some examples, the outermost layer 602 is a polyurethane material that is about 0.8 mm thick.

In the example of FIG. 7, the outer stiffening layer 604 is provided to help increase the stiffness or rigidity of the container 120. In examples where the outermost layer 602 is made of a suitably stiff material (e.g., a suitably thick polypropylene material), the outer stiffening layer 604 is not required. In some examples, the outer stiffening layer 604 is provided over substantially all portions of the container 120. The outer stiffening layer 604 is made of any suitable material including, for example, a plastic (e.g., polypropylene or polyether), a textile (e.g., a soft vulcanized fiber), a metal (e.g., a thin shape-memory alloy), or any other suitable material. In some examples, the outer stiffening layer 604 has a thickness of about 0.5 mm to about 1.0 mm. In some examples, the outer stiffening layer 604 is a soft vulcanized fiber material that is about 0.6 mm thick.

In the example of FIG. 7, the inner stiffening material 606 is provided to further increase the rigidity of the container 120, and is provided only in select portions of the container 120. In some examples, where the container 120 includes deformable portion(s), the absence of the inner stiffening material 606 in one or more portions of the container 120 provides one or more corresponding deformable portions of the container 120. In examples where the container 120 is designed to include deformable side portions (e.g., allowing the container 120 to deform width-wise), the inner stiffening material 606 is absent in the side portions of the container 120. The inner stiffening material 606 is made of any suitable material including, for example, a plastic (e.g., polypropylene or polyether), a textile (e.g., a vulcanized fiber), a metal (e.g., a thin shape-memory alloy), or any other suitable material. In some examples, the inner stiffening material 606 has a thickness of about 0.5 mm to about 1.5 mm. In some examples, the inner stiffening material 606 is a vulcanized fiber material that is about 1.0 mm thick.

In the example of FIG. 7, the reinforcement material 608 is provided to further increase the rigidity of the container 120. In some examples, where the container 120 includes deformable portion(s), the reinforcement material 608 is absent from one or more deformable portions of the container 120. For example, where the container 120 is designed to include deformable side portions (e.g., allowing the container 120 to deform width-wise), the reinforcement material 608 is absent in the side portions of the container 120. The reinforcement material 608 is made of any suitable material including, for example, a plastic (e.g., polypropylene or polyether), a textile (e.g., a vulcanized fiber), a metal (e.g., a thin shape-memory alloy), or any other suitable material. In some examples, the reinforcement material 608 has a thickness of about 0.5 mm to about 2.0 mm. In some examples, the reinforcement material 608 is a vulcanized fiber material that is about 1.2 mm thick.

In the example of FIG. 7, the liner 610 provides the inner surface 108 of the container 120. In some examples, the liner 610 is selected to have a pleasing aesthetic effect. In some examples, the liner 610 is a flexible layer, such as a plastic (e.g., polyurethane, polyether, polypropylene, polyethylene, polyethylene terephthalate or other suitable plastic), a textile (e.g., a felt material or a fiber material) or leather, for example. In this example, the liner 610 is made of a material selected to avoid scratching or marring of the handheld electronic device 800. In this example, the liner 610 is made of a material that is substantially softer and/or more yielding than the outer shell or outer finish of the handheld electronic device 800. In some examples, the liner 610 is also made of a material designed to have a coefficient of friction with the handheld electronic device 800 sufficient to effect an interference fit when the handheld electronic device 800 is received in the container 120. In some examples, the liner 610 has a thickness of about 0.1 mm to about 1.0 mm. In some examples, the liner is a peach fiber material that is about 0.3 mm thick.

The example holder 110b includes the infrared-neutral coating 612 on at least a portion of its inner surface 108. The infrared-neutral coating 612, in this example, is provided on a substrate such as the liner 610. Although the example holder 110b is shown with a reinforcement layer 608, in some examples the reinforcement layer 608 is not needed. In some examples, the infrared-neutral coating 612 is sufficiently thin such that there is no unevenness caused by its application over the liner 610. In some examples, the infrared-neutral coating 612 is already provided on the liner 610 (e.g., pre-coated on the liner 610 or pre-embedded in the liner 610) rather than as a separate coating applied during manufacturing.

Although the outermost layer 602, outer stiffening layer 604, inner stiffening layer 606, reinforcement layer 608, and liner 610 have been described has having certain thicknesses, other thickness values are possible. The thickness of each of the outermost layer 602, outer stiffening layer 604, inner stiffening layer 606, reinforcement layer 608, and liner 610 may vary depending on the material used as well as the method for processing the material.

Third Aspect of the Holder

In a third aspect, the inner surface 108 of the container 120 includes opposing inner surface side portions defined by a substantially non-abrasive material. The substantially non-abrasive material is non-abrasive or substantially non-abrasive relative to the handheld electronic device 800 while the handheld electronic device 800 is being received by the container 120. In some embodiments, for example, the substantially non-abrasive material is material that is softer than any plastic used for the outer surface of the handheld electronic device 800. The non-abrasiveness or substantially non-abrasiveness of the inner surface 108 includes non-abrasiveness or substantially non-abrasiveness exhibited by the substantially non-abrasive material relative to side surface portions of the handheld electronic device 800, while the handheld electronic device 800 is being received by the container. In some examples, the side surface portions of the handheld electronic device 800 are defined by plastic material, and the substantially non-abrasive material is non-abrasive or substantially non-abrasive relative to the plastic material.

In some embodiments, for example, the substantially non-abrasive material is material that is softer than polyurethane. In some embodiments, for example, the substantially non-abrasive material is characterized by a hardness value that is less than the hardness of the outer surface of the handheld electronic device 800. In some examples, the substantially non-abrasive material has a hardness of less than 2.0 on the Mohs hardness scale, for example less than 1.0 on the Mohs hardness scale. In some examples, the substantially non-abrasive material is any material that is determined to be non-abrasive through imperial testing, such as by repeatedly subjecting the material to the outer surface of the handheld electronic device 800 and observing whether there is any damage to the outer surface of the handheld electronic device 800. Abrasive damage includes any mechanical damage that removes material from a surface, including, for example, scratching, scuffing, marring, wearing down or rubbing away of a surface.

At least a portion of the inner surface 108 includes an infrared-neutral material 110 operative for interacting with infrared light emitted from the handheld electronic device 800 and received by the infrared-neutral material 110. The interaction is such that, while the handheld electronic device 800 is being received by the container 120, any reflected infrared signal effected by the interaction is inoperative for effecting activation of a functionality of the handheld electronic device 800 when the reflected infrared signal is sensed by the handheld electronic device 800.

In this respect, the infrared-neutral material 110 is operative for preventing activation of the infrared-sensitive component 808 of the handheld electronic device 800. The infrared-neutral material 110 interacts with any infrared light emitted by the handheld electronic device 800 (e.g., emitted by the infrared emitter 810) that is received by the infrared-neutral material 110. The interaction with the emitted infrared light, while the handheld electronic device 800 is being received by the container 120, results in a reflected infrared signal that is inoperative to effect activation of the infrared-sensitive component 808 when the reflected infrared signal is sensed by the handheld electronic device 800 (e.g., sensed by the infrared sensor 812).

Such interaction includes reflection or absorption of at least a fraction of the emitted infrared light. The infrared-neutral material 110 absorbs or reflects at least a fraction (e.g., at least 50%) of emitted infrared light received from the handheld electronic device 800. Where such interaction includes absorption of at least a fraction of the emitted infrared light, in some examples 90% or more of the emitted infrared light from the infrared emitter 810 is absorbed, such that the infrared sensor 812 senses only 10% or less of the intensity of emitted infrared light. Where such interaction includes reflection of at least a fraction of the emitted infrared light, in some examples up to 70% or more of the emitted infrared light from the infrared emitter 810 is reflected, such that the infrared sensor 812 senses 70% or more of the intensity of emitted infrared light. Such interaction causes the reflected infrared signal to be other than an operative infrared signal that causes activation of the infrared-sensitive component 808. The interaction causes the reflected infrared signal to have an intensity that is outside the range of operative fractions (e.g., about 50% to about 70%) of the intensity of the emitted infrared light.

Although in some examples the infrared-neutral material 110 is provided on the front half 102 of the holder 100, in other examples the infrared-neutral material 110 is provided on the back half 104 of the holder 100 or on both the front half 102 and the back half 104 of the holder 100 (for example, so that activation of the infrared-sensitive component is prevented regardless of which way the handheld electronic device 800 is facing when it is received in the container 120). In some examples, the infrared-neutral material 110 is provided in other portions of the inner surface 108 of the container 120, for example where the holder 100 does not include front and back halves 102, 104. In some examples, the infrared-neutral material 110 is positioned so as to be aligned with the infrared-sensitive component when the handheld electronic device 800 is being inserted into the container 120.

In some examples, a suitable infrared-reflecting material 110 includes any material that is substantially reflective to broad spectrum white light. In some examples, the infrared-neutral material 110 is a substantially smooth plastic material (including plastic materials with a high gloss surface finish), such as polyurethane, polyether, polypropylene, polyethylene, polyethylene terephthalate, polycarbonate (e.g., high gloss polycarbonate), acrylonitrile butadiene styrene, or a mixture of polycarbonate and acrylonitrile butadiene styrene. Other examples of suitable materials include any material that is specifically reflective to infrared light.

In the present disclosure, infrared light includes light having wavelengths within the range of, for example, about 700 nm to about 300,000 nm or greater, for example about 700 nm to about 2,500 nm, or other wavelength ranges generally recognized as being infrared light.

In some examples, the infrared-neutral material 110 is not required to be infrared-neutral for all light within the full infrared wavelength range, but is infrared-neutral only for light having wavelengths that cause activation of the infrared-sensitive component 808 of the handheld electronic device 800.

In the present disclosure, the infrared-neutral material 110 is not required to be 100% neutral or invisible to incident infrared light, but is sufficiently infrared-neutral to prevent activation of the infrared-sensitive component or functionality 808. In some examples, instead of absorbing or reflecting 100% of the emitted infrared light, the infrared-neutral material absorbs or reflects only a fraction of the emitted infrared light, sufficient to prevent activation of the infrared-sensitive component 808, as described above.

In some examples, the infrared-neutral material 110 includes an infrared-neutral coating.

In some examples, the infrared-neutral coating is any suitable paint or coating that prevents activation of the infrared-sensitive component of the handheld electronic device 800. In some examples, the infrared-neutral coating is infrared-absorbing or infrared-reflecting.

Examples of a suitable infrared-neutral coating include infrared-absorbent constituents such as: thin film metals (including, for example, copper, gold, nickel, silver, and combinations thereof), metal oxides (including, for example, hafnium oxide, indium tin oxide, magnesium oxide, silicon monoxide, titanium dioxide, tantalum oxide, zirconium oxide, and combinations thereof), nickel manganese ferrite, iron chromite, cadmium stannate, organic compounds (including, for example, chlorophyll), and combinations thereof. In some examples, the infrared-neutral coating is any suitable infrared-invisible paint, such as those used for camouflage or stealth purposes.

In some examples, the infrared-neutral coating is an infrared-reflective paint or coating, including paints and/or pigments developed for heat-reflection purposes, such as the Arctic® pigments developed by Shepherd Color Company, the Insultec™ head reflective paints, the ZEFFLE™ infrared reflective coatings, and other suitable paints or coatings.

In some examples, the infrared-neutral coating is an infrared-absorbing paint or coating, including paints and/or pigments such as the Vanceva™ coating developed by Solutia and Sumitomo Metal Mining.

In some examples, the infrared-neutral coating is applied to a substrate (e.g., the lining 610) that is incorporated within the holder 100. In some examples, the infrared-neutral coating is applied to the substrate before the substrate is incorporated within the holder 100.

Methods of Manufacture

In some aspects of the present disclosure, there is provided methods of manufacturing a holder for a handheld electronic device, which are suitable for one or more of the example holders 100, 100a, 100b described above.

In some examples, a method of manufacturing the holder 100, 100a, 100b includes laminating a plurality of layers (e.g., the layers 602, 604, 606, 608 and 610 described above, and including the infrared-neutral material 110 where appropriate) together to form a composite material. In some examples, the layers are pre-cut into the desired shape. In other examples, the layers are cut after lamination. The composite material is then formed into the desired shape and fastened together to form the container 120.

In some examples, the method of manufacturing the holder 100, 100a, 100b includes:

(a) cutting suitable material for each layer (e.g., one or more of the layers 602, 604, 606, 608 and 610, including the infrared-neutral material 110 for the first aspect of the holder) to the desired shape for each portion (e.g., front half 102 and back half 104) of the holder 100, 100a, 100b;

(b) laminating or adhering the individual material components together and thereby providing a composite material. In some examples, the composite material has a total composite thickness of about 3.0 mm to about 6.0 mm, for example about 4.5 mm;

(c) in the second aspect of the holder, where the infrared-neutral coating 612 is used (e.g., for the example holder 100b), the infrared-neutral coating 612 is applied (e.g., by painting, printing, spray-coating, brush-coating, dip-coating, spin-coating or any other appropriate method) to at least a portion of a substrate material that is incorporated into the holder, to serve as the inner surface 108;

(d) pre-forming the composite material into a general cup or curved shape (e.g., using appropriate shaping techniques such as thermal shaping);

(e) where necessary, sealing any raw edges of the composite material, for example by applying an edge paint;

(f) fastening the portions (e.g., the front half 102 and the back half 104) together (e.g., using stitching, glue or other appropriate methods); and (g) subjecting the stitched portions to a final forming process (e.g., thermal shaping) to shape the container 120 to its final form and shape.

In some examples, where appropriate, the example method includes additional features and further processing. In some examples, a fastener, a strap and/or a magnet are added to the holder 100, 100a, 100b.

It should be understood that the embodiments and examples discussed in the present disclosure are for the purpose of illustration only and are not intended to be limiting. Variations are possible, including the use of different materials, dimensions and/or techniques, and such variations are within the scope as described and claimed. Features described in separate embodiments may be used in combination. All values and sub-ranges within disclosed ranges are also hereby disclosed. All references mentioned are hereby incorporated by reference.

The invention claimed is:

1. A holder for a handheld electronic device, the holder comprising:

a container defining a space for receiving the handheld electronic device, the container including a liner providing an inner surface facing inwardly towards the space, the liner comprising a material embedded in the liner to cause no unevenness in the inner surface, wherein the embedded material is interactive with infrared light emitted from the handheld electronic device and received by the embedded material, wherein the interaction comprises absorption of a majority of the emitted infrared light, such that, while the handheld electronic device is being received by the container, any reflected infrared signal effected by the interaction has an intensity outside a range of intensities that is operative for effecting activation of a functionality of the handheld electronic device when the reflected infrared signal is sensed by the handheld electronic device.

2. The holder of claim 1, wherein the embedded material is coated with a coating rendering the embedded material to be interactive with infrared light, thereby providing for the interaction when infrared light emitted from the handheld electronic device is received by the embedded coating.

3. The holder of claim 1, wherein the container is adjustable so as to effect an increase or a decrease to the space.

4. The holder of claim 3, wherein when the handheld electronic device is received in the container, deformation of at least one deformable container portion is effected to provide at least one deformed container portion that exerts a force urging the at least one deformed container portion against at least a portion of the received handheld electronic device to effect the increase or the decrease in the space, such that the adjustability of the container is at least partly attributable to the at least one deformable portion.

5. The holder of claim 1, wherein the embedded material is operative to absorb at least 90% of the emitted infrared light.

6. The holder of claim 1, wherein the functionality includes a navigation function.

7. The holder of claim 1, further comprising a fastener for releasably fastening the holder to a user.

8. The holder of claim 1, wherein the liner is non-abrasive or substantially non-abrasive relative to the handheld electronic device while the handheld electronic device is being received by the container.

9. A handheld electronic device and a holder, the handheld electronic device comprising a processor coupled to an infrared light-emitting navigation component, the holder comprising:
a container defining a space for receiving the handheld electronic device, the container including a liner providing an inner surface facing inwardly towards the space, the liner comprising a material embedded in the liner to cause no unevenness in the inner surface, wherein the embedded material is interactive with infrared light emitted from the navigation component and received by the embedded material, wherein the interaction comprises absorption of a majority of the emitted infrared light such that, while the handheld electronic device is being received by the container, any reflected infrared signal effected by the interaction has an intensity outside a range of intensities that is inoperative for effecting activation of a functionality of the handheld electronic device when the reflected infrared signal is sensed by the handheld electronic device.

10. The handheld electronic device and the holder of claim 9, wherein the embedded material is coated with a coating rendering the embedded material to be interactive with infrared light, thereby providing for the interaction when infrared light emitted from the handheld electronic device is received by the embedded coating.

11. The handheld electronic device and the holder of claim 9, wherein the navigation component comprises an infrared light-emitting trackpad comprising an infrared emitter and an infrared sensor, wherein the infrared emitter emits the infrared light and the infrared sensor senses the reflected infrared signal.

12. The handheld electronic device and the holder of claim 9, wherein the container is adjustable so as to effect an increase or a decrease to the space.

13. The handheld electronic device and the holder of claim 12, wherein when the handheld electronic device is received in the container, deformation of at least one deformable container portion is effected to provide at least one deformed container portion that exerts a force urging the at least one deformed container portion against at least a portion of the received handheld electronic device to effect the increase or the decrease in the space, such that the adjustability of the container is at least partly attributable to the at least one deformable portion.

14. The handheld electronic device and the holder of claim 9, wherein the embedded material is operative to absorb at least 90% of the emitted infrared light.

15. The handheld electronic device and the holder of claim 9, further comprising a fastener for releasably fastening the holder to a user.

16. The handheld electronic device and the holder of claim 9, wherein the liner is non-abrasive or substantially non-abrasive relative to the handheld electronic device while the handheld electronic device is being received by the container.

\* \* \* \* \*